United States Patent [19]

Fujiwara

[11] 4,407,330
[45] Oct. 4, 1983

[54] PRESSURE PULSE ABSORBING DEVICE

[75] Inventor: Haruyoshi Fujiwara, Mihara, Japan

[73] Assignee: Mitsubishi Jukogyo Kabushiki Kaisha, Tokyo, Japan

[21] Appl. No.: 342,920

[22] Filed: Jan. 26, 1982

Related U.S. Application Data

[63] Continuation of Ser. No. 116,604, Jan. 24, 1980, abandoned.

[30] Foreign Application Priority Data

Feb. 2, 1979 [JP] Japan .................................. 54-11299

[51] Int. Cl.³ ............................................ F16L 55/04
[52] U.S. Cl. ..................................................... 138/30
[58] Field of Search .................. 138/26, 30; 220/85 B

[56] References Cited

U.S. PATENT DOCUMENTS

3,125,033  3/1964  Marye .................................... 138/30
3,130,751  4/1964  Lopas .................................... 138/30
4,088,154  5/1978  Patton et al. .......................... 138/30

Primary Examiner—James E. Bryant, III
Attorney, Agent, or Firm—Wenderoth, Lind & Ponack

[57] ABSTRACT

A pressure pulse damping device which is used in a liquid passage having a bottom flat wall. The flat wall has an opening therethrough with a flexible diaphragm positioned therein. The side of the diaphragm opposite the liquid passage is in communication with a gas chamber having gas therein. The diaphragm is movable such that the effective volume of the gas chamber is varied to ensure that the average pressure of the gas therein is substantially equal to the average pressure of liquid in the liquid passage.

7 Claims, 13 Drawing Figures

PRESSURE PULSE ABSORBING DEVICE

This application is a continuation of application Ser. No. 116,604, filed Jan. 24, 1980, now abandoned.

FIELD OF THE INVENTION

This invention relates to a pressure pulse damping device for use in damping a pressure pulse in a liquid pipe and, more particularly, to a pressure pulse damping device for use in a liquid inlet for a paper machine, or for use in a pipe through which a liquid is fed to a stock inlet, or for use in preventing variations in the feed rate of a liquid to a stock inlet, or for subsequently preventing variations in the discharge rate of a liquid from a stock inlet and thereby obtaining uniformity in production. A pressure pulse absorbing device according to the present invention produces a specially good effect when it is utilized in a hydraulic stock inlet because these devices are highly sensitive to pressure pulses.

Conventional pressure pulse damping devices include surge tank and attentuator types.

Figure 1:
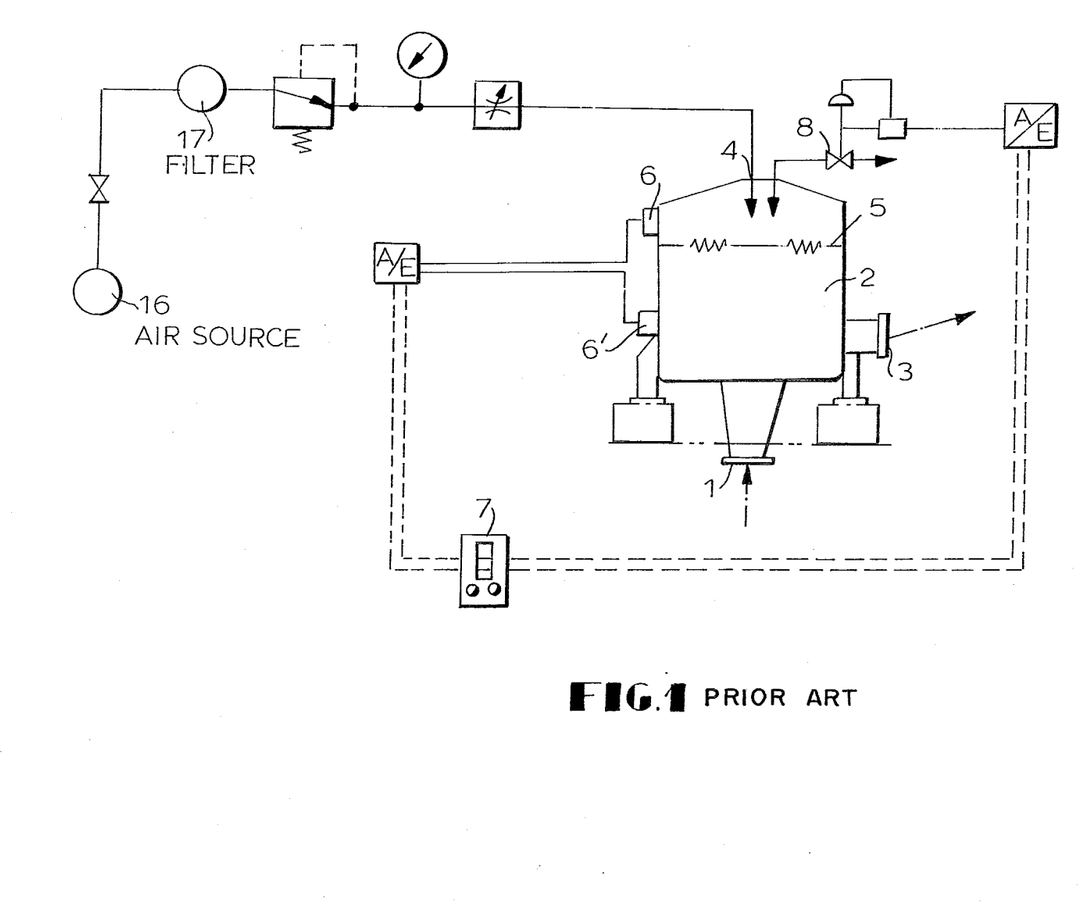
FIG. 1 is a schematic diagram of a conventional prior art surge tank type pressure pulse absorbing device.

First, a prior art surge tank type pressure pulse damping device will be described with reference to FIG. 1.

An inlet for a liquid is provided below the bottom wall of a surge tank 2, and an outlet 3 for the liquid is provided at a lower portion of the side wall thereof. Compressed air is supplied into the surge tank 2 from an upper air inlet to form a free liquid level 5 therein.

When the pressure at the inlet 1 is increased, the liquid level 5 is raised which compresses the air in the upper portion of the tank 2, and this increase in pressure is sensed by D/P cells 6, 6'. The pressure at the outlet 3 is increased by the sum of a value representing an increase in pressure which has caused the liquid level 5 to be raised and a value representing an increase in pressure in the upper portion of the tank 2. In order to maintain the pressure at the outlet 3 at a constant level, the air in the upper portion of the tank 2 is discharged into the atmosphere from a regulator valve 8 via a regulator gauge 7.

When the pressure at the inlet 1 is decreased, a suitable amount of air is introduced into the upper portion of the tank 2 via the inlet 4 or the valve 8.

Problematic pressure pulses are generally ones of 0.2-30 Hz. It has heretofore been difficult or impossible to sense pressure pulses of not less than 1 Hz by D/P cells 6, 6' in a surge tank type pressure pulse damping device as described above. Even when an electron tube type regulator gauge 7 is used, an operational delay of 1-2 seconds occurs between the pulse sensing and the actuation of the regulator valve 8 which responds to the regulator gauge 7. Furthermore, the presence of air in the surge tank 2 complicates the detection of a pressure pulse. The above mentioned problems have been obstacles to the easy and reliable detection of pressure pulses of not less than 1 Hz by a control system.

The above is a description of a system where the liquid level 5 in the tank 2 is varied without delay with respect to variations in pressure at the inlet 1. However, since an inertia force due to the mass of the liquid in the tank 2 occurs during operation when the liquid level 5 is varied it is difficult to vary the liquid level in accordance with variations in a high-frequency pressure. Consequently, the above-described pressure pulse damping device can be used mainly for sensing variations in a low-frequency pressure.

Additionally, variations in pressure of not more than 0.1 Hz can be sensed only if the number of revolutions of a liquid feed pump is controlled. Aside from the problems relating to the performance of the above-mentioned pressure pulse damping device, the portion of the inner surface of the tank 2 which is in contact with the air-liquid interface tends to become soiled. Furthermore, the tank 2 is substantially as large as the liquid stock inlet. The above described characteristics cause an increase in the manufacturing cost of the device.

Now, a prior art attenuator will be described with reference to FIG. 2. An inlet 9 of a liquid passage 11 has a circular cross section, and the passage 11 is gradually reduced in cross section from the inlet 9 to an intermediate portion thereof and finally to a semicircular cross section 10 as shown in FIG. 2b. A flat wall 10a is thus formed at the upper wall of the passage 11, and a diaphragm 12 consisting of a rubber plate is provided in the flat wall 10a. An air chamber 13 is provided atop the diaphragm 12, and air is introduced into the chamber 13 at a predetermined flow rate.

A tubular nozzle 14 having a bore in the central portion thereof is provided above and extended close to the upper surface of the central portion of the diaphragm 12 and is communicated with the atmosphere via a manually operable throttle.

The portion of the passage 11 which is on the downstream side of the diaphragm 12 is gradually enlarged in cross section until the downstream portion extends to an outlet 15.

Figures 2A, 2B:
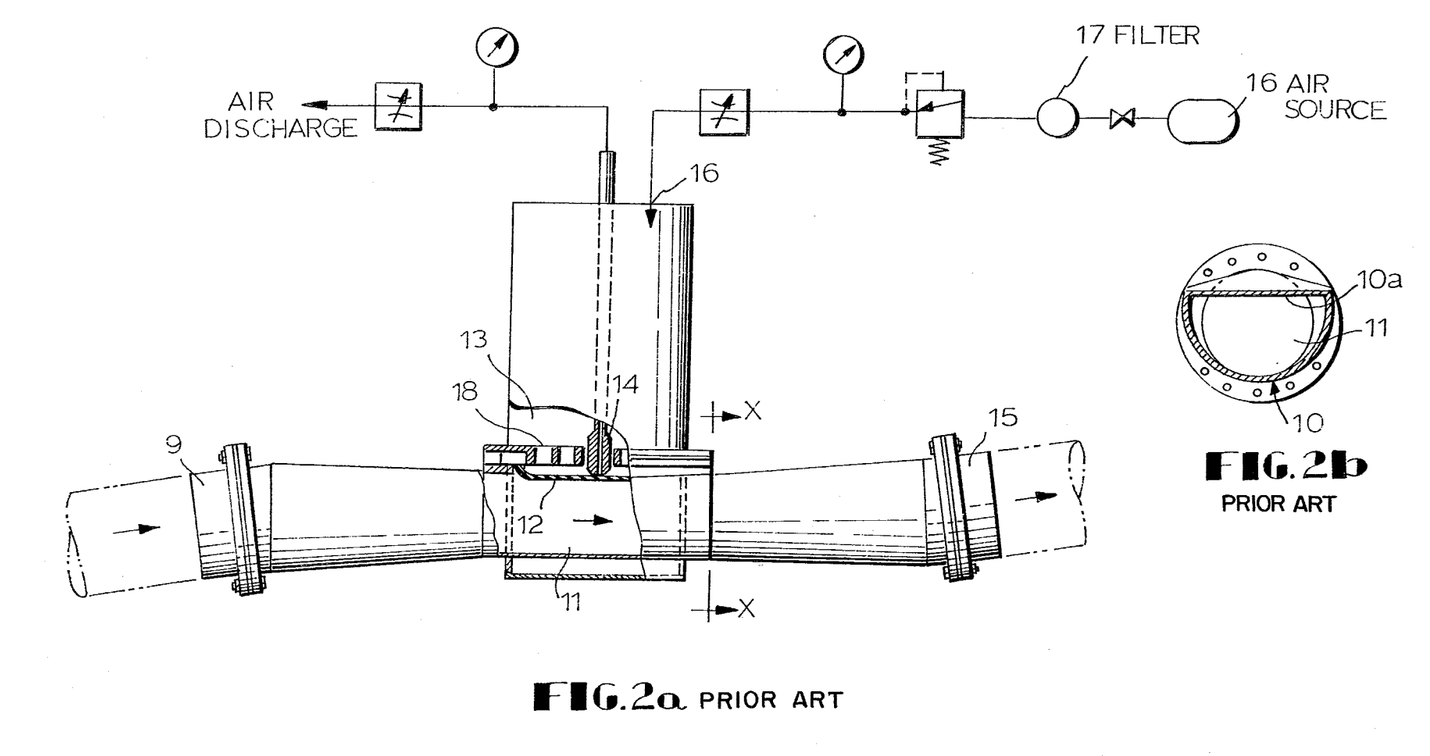

Referring to FIG. 2a the reference numeral 16 denotes an air source, 17 an air filter, and 18 a porous plate.

When the pressure of the liquid is increased, the diaphragm 12 is moved upwardly toward and eventually abuts the open end of the nozzle 14 so that the discharging of air from the air chamber 13 is terminated. However, air is still fed into the air chamber 13 from a feed inlet 16 so that the pressure in the air chamber 13 is continuously increased.

When the pressure in the air chamber 13 becomes greater than the liquid pressure in the passage 11, or when the liquid pressure in the passage 11 is decreased, the diaphragm 12 moves downwardly and the air in the air chamber 13 is discharged to the atmosphere via the nozzle.

The diaphragm 12 is thus vertically moved to vary the capacity of the passage 11 so that variations in pressure of the liquid are damped. The volume of liquid which is required to effect the variations in capacity of the passage 11 corresponds to the variations in the flow rate of the liquid and are minimal as compared to the volume of liquid required in the above-mentioned surge tank type pressure pulse damping device. Accordingly, the operational delay due to an inertia force can be minimized in the attentuator device as compared to a surge tank device. Since the pressure in the air chamber 13 is controlled by the diaphragm 12 exhibiting only a small inertia force and without using a measuring instrument, the attenuator type device can be smoothly operated thereby producing a good effect with respect to high-frequency pressure pulses of not less than 3 Hz.

However, when the pressure pulse of liquid in a system as shown in FIG. 2 is decreased to around 0.5 Hz, the system works as a pressure pulse amplifier because the cycle of pressure increase, for example, in the passage 11 (containing the liquid) is long. Therefore, when the pressure in the passage 11 is increased, the pressure in the air chamber 13 is also increased due to the air being continuously fed thereinto from the air source 16 until the liquid which has been passed through the rubber plate 13 is forced out by the upward movement of the rubber plate 13. As a result, the pressure of the liquid is increased.

When the pressure of liquid is decreased for an extended period of time, the air in the air chamber 13 is discharged therefrom to allow the liquid in the passage 11 to be act on the diaphragm 12. As a result, the pressure of the liquid is decreased. Variations in flow rate per cycle of low-frequency pulses are generally greater than that of high-frequency pulses. If the low-frequency pulses are amplified by an attenuator, the attenuator may lose its significance as a pulse damping device.

Moreover, the diaphragm 12 is expanded and deformably stretched with the lapse of time of use, and therefore the portion of the diaphragm 12 which contacts the nozzle 14 is waved or wrinkled which causes air leaks at all times. As a result, the diaphragm 12 ceases to function effectively as an exhaust valve. In the worst of situations, the effect of the attenuator is remarkably decreased with only a day's use.

SUMMARY OF THE INVENTION

An object of the present invention is to eliminate the drawbacks encountered in the above-described conventional pressure pulse damping devices.

Another object of the present invention is to provide a pressure pulse damping device having a stable attenuating effect over a long period of time with respect to pressure pulses of not more than 1 Hz and also substantially the same effect over a long period of time with respect to pressure pulses of 1-30 Hz.

A pressure pulse damping device according to the present invention is characterized by the following.

(a) A flat wall is provided at the bottom periphery of a liquid passage, and a diaphragm coprising a rubber plate, which has a small mass and which is easily deformable is provided in the flat wall. A chamber is provided on the opposite side of the flat wall defining the liquid passage and on the opposite side of the diaphragm. This chamber is substantially a sealed chamber in which a gas, the pressure of which is substantially equal to the average pressure of the liquid, is contained. The diaphragm is deformed in accordance with the pressure pulses of the liquid so as to vary the capacity of the liquid passage and thereby damp the pressure pulses. Since the sealed chamber contains a gas therein, the chamber merely cooperates in damping the pressure pulses irrespective of the amplitude of cycle of the pressure pulses and never causes the pressure pulses to be amplified. Since the amount of the liquid stored or discharged in accordance with the deformation of the diaphragm can be set equal to the amount of pulse current corresponding to the pressure pulse, an inertial resistance occurring due to the movement of liquid can be minimized.

(b) The diaphragm is provided in a lower portion of the wall of the liquid passage such that the diaphragm can be vertically moved. The gas sealed in the chamber is adiabatically expanded or compressed in accordance with the vertical displacement of the diaphragm so that the pressure in the chamber is decreased or increased. In the meantime, the pressure of the liquid cannot be kept constant unless the pressure applied thereto by the diaphragm is decreased or increased in accordance with the vertical movements of the diaphragm. Therefore, if the chamber is provided in a lower portion of the wall of the liquid passage, to suitably vary the capacity of the chamber, the pressure of the liquid can be kept constant irrespective of the position of the diaphragm.

(c) Since a gas of a pressure equal to an average pressure of the liquid is sealed in the chamber to allow the diaphragm to be vertically displaced in accordance with the pressure pulses such that the diaphragm is not forced to an upper or lower limit position, the position of the diaphragm can be detected by limit switches, differential transformers, potentiometers, or proximity switches so that the introduction or discharge of gas into or from the chamber is conducted only when the diaphragm comes close to a stroke end. The introduction or discharge of gas into or from the chamber is not conducted when the diaphragm is in other position than the ones mentioned above. Thus, the above-mentioned characteristics can be obtained.

(d) The capacity of the gas chamber which is referred to in paragraph (c) above varies as a function of the average pressure of the liquid. Therefore, a substantially compressible fluid or gas is utilized in the chamber or a tank communicating with the chamber such that the characteristic referred to in paragraph (b) can be obtained even when the operational conditions are altered such that the average pressure of the liquid has changed.

BRIEF DESCRIPTION OF THE DRAWINGS

Embodiments of the present invention will now be described with reference to the accompanying drawings, wherein:

FIG. 2a is a sectional view of a principal part of a conventional prior art attenuator;

FIG. 2b is a sectional view taken along the line X—X in FIG. 2a;

FIG. 3b is a sectional view taken along the line Y—Y in FIG. 3a;

DETAILED DESCRIPTION OF THE INVENTION

Figure 3A:
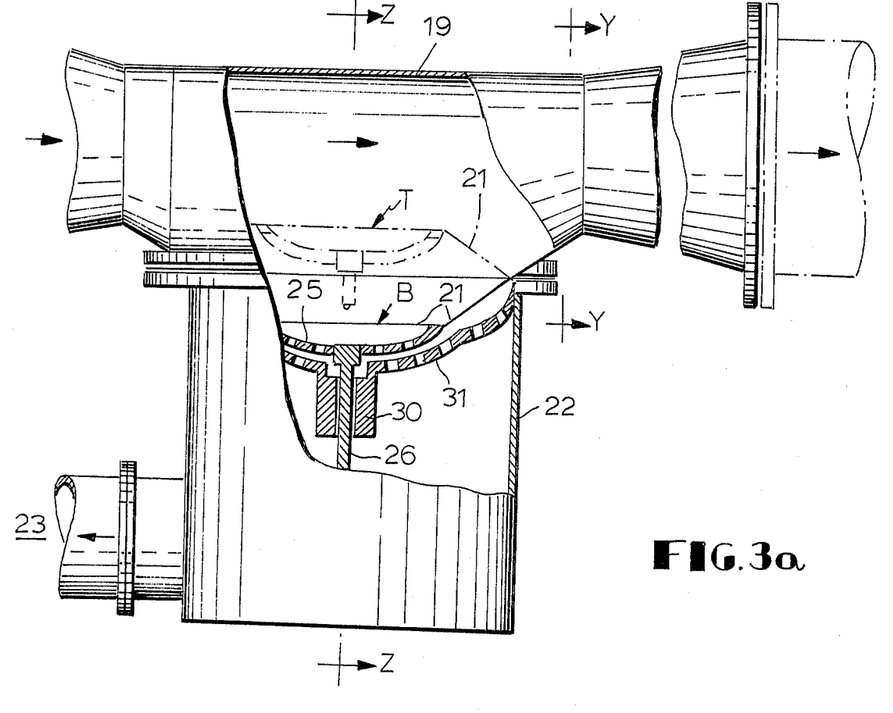
FIG. 3a is a side elevational partially sectional view of a pressure pulse absorbing device embodying the present invention.
Figure 3B:
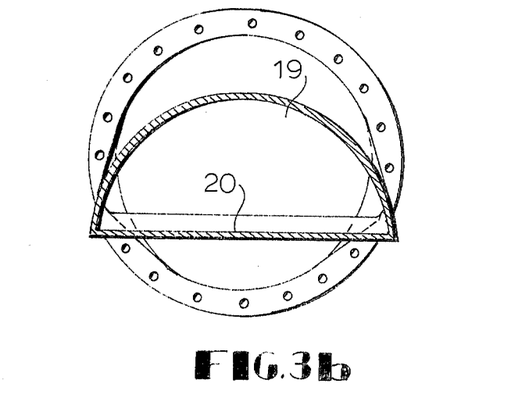

Referring to FIGS. 3a and 3b, the fluid passage 19 in the area adjacent a chamber 22 is hemispherical in cross section. At least part of the flat wall thereof is replaced with a diaphragm 21. The chamber 22 is positioned under the diaphragm 21, and a gas, such as air is contained in the chamber 22. When the volume of gas in the chamber 22 is low, a volume tank 23 is communicated therewith in a suitable manner. A level gauge 24 is provided in the volume tank 23, which is adapted to allow a gas to be placed therein and discharged therefrom. The chamber 22 contains a gas and its pressure is equal to the average pressure of the liquid.

Figure 4:
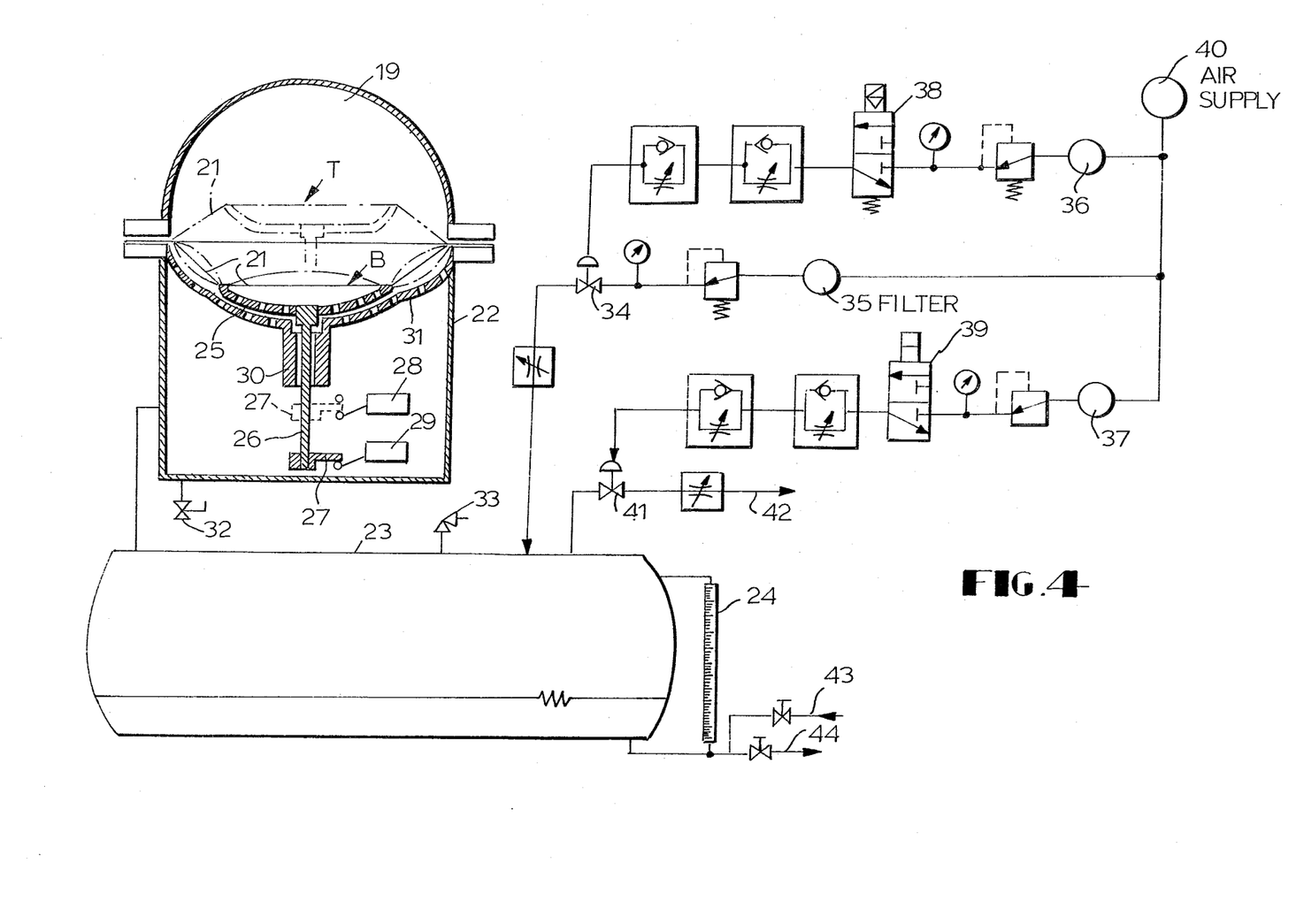
FIG. 4 is a sectional view taken along the line Z—Z in FIG. 3a, with pipes schematically shown.

An diaphragm 21 can be moved from an upper limit position T to a lower limit position B. The embodiment as shown in FIG. 4 employs limit switches as means for detecting the upper and lower limit positions T and B.

A support frame 25 comprising of a porous plate is secured to the diaphragm 21, and a support rod 26 is fixed to the central portion of the support frame 25. A control member 27 is fixed to the support rod 26. A limit switch 28 for detecting an upper limit position of the diaphragm and a limit switch 29 for detecting a lower limit position thereof are provided within the chamber 22. The limit switches 28, 29 are actuated by the control member 27 when the diaphragm 21 reaches the upper limit position and the lower limit position, respectively.

A guide member 30 is fixed to the wall of the chamber 22 via a porous plate 31 such that the support rod 26 can be moved in the vertical direction within the guide 30.

When the diaphragm 21 reaches the lower limit position B, the peripheral portion of the porous plate 31 serves as a support for the diaphragm, and the central portion of the porous plate 31 as a support for the support frame 25. Even when the diaphragm 21 is moved downward vertically the space thereunder is kept in communication with the interior of the chamber 22 via bores in the support frame 25 and the porous plate 31 so that the pressure in the space can be kept equal to that of the interior of the chamber 22.

Referring to FIG. 4, reference numeral 32 denotes a drain valve; 33 a safety valve; 34 an air charge valve; 35, 36, and 37 air filters; 38, 39 electromagnetic valves; 40 an air supply source in a factory; 41 an air discharge valve; 42 an air relief pipe; 43 a water feed pipe; and 44 a water discharge pipe.

The operation of the above embodiment will be described with reference to FIGS. 4 and 5.

When the pressure of a liquid in the liquid passage 19 is increased, the diaphragm is moved downwardly, and the limit switch 29 which detects the lower limit position of the diaphragm 21 is actuated, and the air charge valve 34 is gradually opened so that air begins to be gradually introduced into a volume tank 23 which is connected to the chamber 22. The gas influx causes the diaphragm to move upwardly. When a predetermined period of time has elapsed after the control member 27 is moved from the limit switch 29, the air charge valve 34 is gradually closed. As a result, the feed rate of air into the volume tank 23 is gradually decreased and finally stopped.

When, on the contrary, the pressure of the liquid is decreased, the diaphragm is moved upwardly, and the limit switch 28 which defects the upper limit position of the diaphragm 21 is actuated, and the air discharge valve 41 is gradually opened so that the air in the volume tank 23 begins to be gradually discharged therefrom. The gas discharge causes the diaphragm to move downwardly. When a predetermined period of time has elapsed after the control member 27 is moved from the limit switch 28, the air discharge valve 41 is gradually closed. As a result, the discharge rate of air from the volume tank 23 is gradually decreased and finally stopped.

Figure 5:
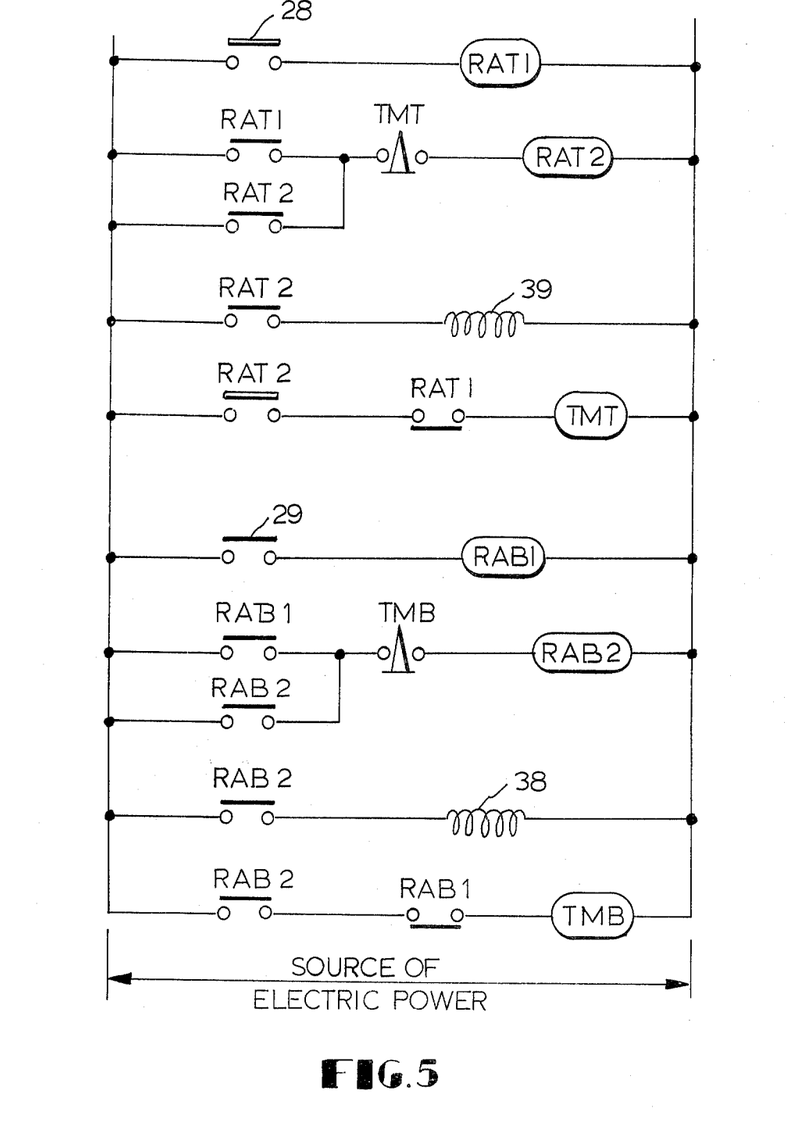
FIG. 5 is a diagram of an electric circuit of the embodiment shown in FIG. 4.

Diagrams of examples of air circuit and electric circuit for carrying out the above-described operation are shown in FIGS. 4 and 5.

If the air charge valve 34 and air discharge valve 41 are actuated as mentioned above, the time for feeding and discharging air can be suitably adjusted by timers TMB, TMT. The diaphragm 21 can be moved between the upper and lower limit positions when the pressure of the liquid is changed. When the pressure of the liquid is increased or decreased in accordance with the pulsation of the liquid, the diaphragm 21 can be moved between the upper and lower limit positions if the magnitude of the resulting pulse current is within the range of levels which can be damped while the diaphragm 21 is vertically moved.

When the pressure of the liquid is increased by the pulsation thereof with the average pressure of the liquid and of the air in the chamber 22 being in a state of equilibrium, the diaphragm 21 is downwardly swelled such that it abuts the support frame 25. Assuming that the pressure of the air in the chamber 22 is not changed at all, the pressure of the liquid in the passage 19 is decreased by a level corresponding to the pressure of that portion of the liquid which is displaced by the downwardly swelled diaphragm 21.

In fact, the gas in the chamber 22 is adiabatically compressed by a level corresponding to that portion of the gas which is displaced by the downwardly swelled diaphragm 21, so that the pressure of the air in the chamber 22 is increased. Thus, a decrease in the pressure of the liquid can be prevented. The same situation applies to a case where the pressure of the liquid is decreased due to the pulsation thereof. Accordingly, if a total capacity of the chamber 22 and volume tank 23 is set to a suitable level, the pressure of the liquid can be kept constant.

When the frequency of a pulse is increased, the amplitude may be increased but variations in the flow rate of the liquid per cycle of pulse is small as compared with that flow rate variation per cycle of a low-frequency pulse. Therefore, a high-frequency pulse can be effectively damped by the swelling of the diaphragm 21 alone as shown in chain line in FIG. 4 without moving the support frame 25. As is clear from the above disclosure the stroke of the diaphragm 21 of the device can be minimized and a high-frequency pulse can be effectively eliminated.

The embodiment described above and shown in FIGS. 3 and 4 employs a trapezoidal diaphragm. A diaphragm of a respectively greater diameter is required for a liquid having a respectively greater flow rate. However, the characteristics of the present invention do not reside in the shape of the diaphragm; and therefore, the diaphragm may be of a truncated pyramid or of a plate type if it is made of a material of a high elasticity.

Figure 6:
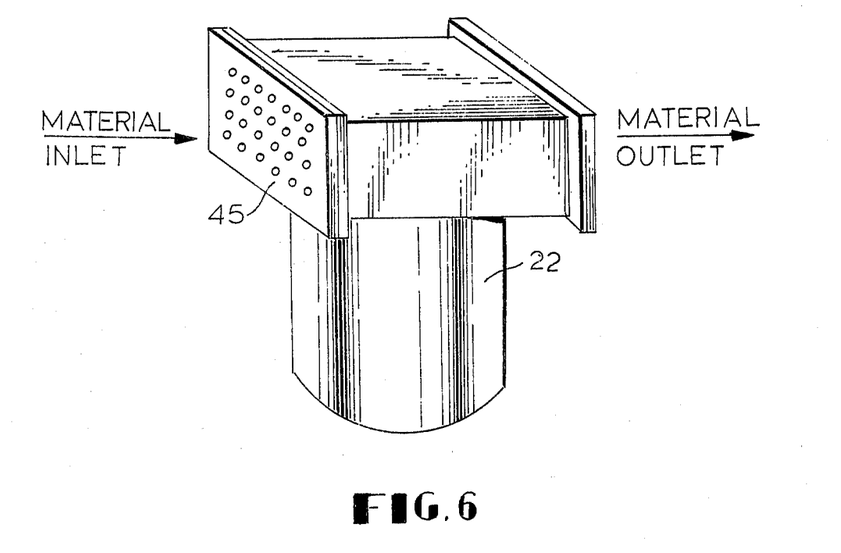
FIG. 6 is a perspective view of a principal portion of another embodiment of the present invention.

FIG. 6 shows another embodiment of the present invention which includes a porous plate 45. Unlike the embodiment shown in FIGS. 3 and 4, in which the portion of the liquid passage 19 which is provided with the diaphragm 21 has a semicircular cross section, the liquid passage in the embodiment shown in FIG. 6 may have a rectangular cross section since the passage need only have a flat lower wall for the convenience of providing a diaphragm therein. In addition, in a pressure pulse damping device according to the present invention there is no criticality as to the shape of the liquid leading into and going out of the passage section where the diaphragm is positioned. Accordingly, a liquid-introducing and discharging passage can be circular in cross section and gradually changed in cross section toward the diaphragm-carrying portion. However the cross section of the passage, accommodating the diaphragm should substantially resemble that of FIG. 3a. Thus, the liquid passage may comprise a plurality of different cross-sectional parts which are joined together with flanges in those positions of the passage which are immediately before and after the diaphragm-carrying portion.

A pulse damping device in general is adapted to easily damp pressure pulses in a fluid passage. Accordingly, the pulse damping device of the present invention in essence constitutes a node of a stationary wave. The pulse damping device may be disposed with respect to any portion of a passing wave but it should be disposed at an abdominal portion rather than a nodular portion of a stationary wave. Consequently, a combination system is also effective in which a porous plate 45 as shown in FIG. 6 is provided immediately before a diaphragm-carrying portion of a fluid passage so as to prevent a node of a stationary wave from coinciding with the diaphragm-carrying portion of a fluid passage.

Figure 7:
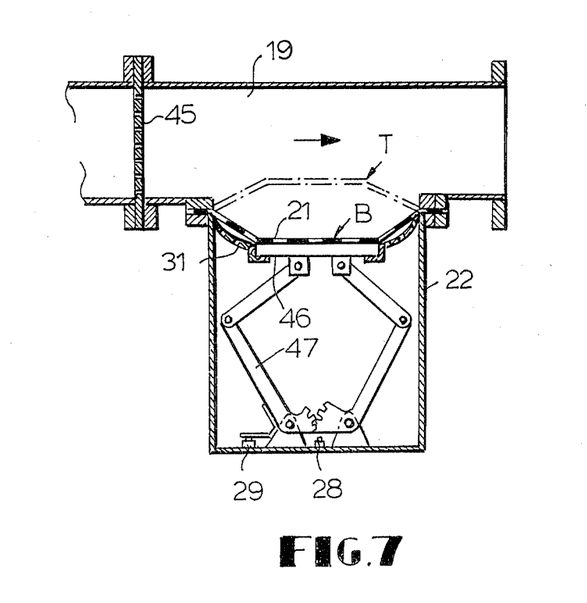
FIG. 7 is a side elevational sectional view of still another embodiment of the present invention.

In the embodiment shown in FIGS. 3 and 4, a support rod 26 is connected to the support frame 25 and can be moved along a guide 30. A support frame 46 in an embodiment as shown in FIG. 7 is provided with a link 47 so as to allow a diaphragm 21 to be vertically moved.

Figure 8:
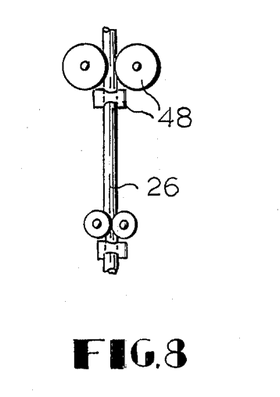
FIG. 8 is a side elevational view of another type of guide mechanism for a support rod.

In a guide mechanism, as shown in FIG. 8, rollers 48 are provided around a support rod 26 which function like the guide 30 the function thereof being disclosed with respect to the embodiment as shown in FIGS. 3 and 4.

In short, a guide mechanism need only to be constructed so as to substantially eliminate mechanical resistance and inertial resistance due to the mass of a diaphragm. These resistances present obstacles to the diaphragm's movement because the diaphragm is moved by the differential pressure the liquid and the air. Additionally, the guide mechanism also must be constructed such that the diaphragm can reach the upper and lower limit positions and can be detected when these respective positions have been reached.

Figure 9:
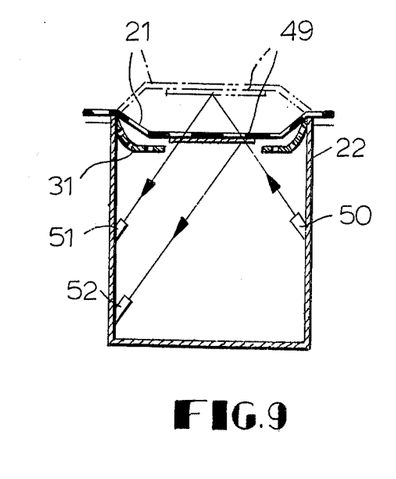
FIG. 9 is a side elevational sectional view of a further embodiment of the present invention.

The detection of a respective position of a diaphragm will be described. The embodiment shown in FIGS. 4 and 5 employs limit switches for the detection of the diaphragm 21 when in upper and lower limit positions, but these limit switches may be replaced with other means. A means for detecting the diaphragm when in the upper and lower limit positions may be constructed, for example, as shown in FIG. 9. The detection means shown in FIG. 9 comprises a reflector member 49, made of a metal foil and fastened to the surface of the diaphragm 21 which is facing the chamber 22, a light projector 50, fixed to the inner surface of the chamber 22, and light receivers 51, 52, fixed to the inner surface of the chamber 22 to receive light from the diaphragm 21 when it is in the upper and lower limit positions.

Figure 10:
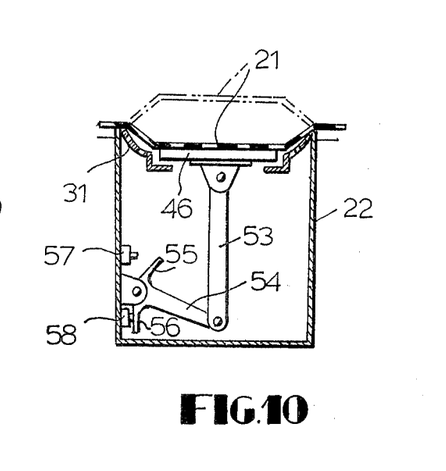
FIG. 10 is a side elevational sectional view of a further embodiment of the present invention.

Other detection means may be used as those skilled in the art can readily appreciate for example, proximity switches, potentiometers, servo-motors and differential transformers may be used. Where anyone of the above-mentioned detection means is used, a diaphragm 21 may be supported as shown in FIG. 10. Referring to FIG. 10, a connecting rod 53 is joined at its one end with a pin to a support frame 46, and a swing arm 54 is pivotally connected at its one end to the other end of the connecting rod 53. The swing arm 54 is pivotally connected at the other end thereof to the inner surface of a side wall of a chamber 22. When the diaphragm 21 reaches the upper or lower limit position, the swing arm 54 is respectively moved upwardly or downwardly. As a result, proximity switches 57, 58 provided on the inner surface of a side wall of the chamber 22 are actuated by projections 55, 56 which extend respectively upwardly and downwardly from the swing arm 54. Thus, when the diaphragm 21 is in the upper or lower limit position, this information is sensed by proximity switches 57, 58.

Further an ultrasonic position detector may be provided in the bottom portion of a chamber 22, so that when the diaphragm 21 is in the upper or lower limit position the ultrasonic waves reflected on the diaphragm 21 serve as a means to indicate this fact.

In the embodiment as shown in FIG. 4, an air charge valve 34 and an air discharge valve 41 are provided so as to respectively feed or discharge air from the volume tank when a diaphragm 21 reaches the upper or lower limit position. In this case, the feeding or discharging of gas is gradually initiated and gradually terminated in order to prevent the liquid from being influenced by an external force. In order to carry out the this operation, the electric valves may be used.

Figure 11:
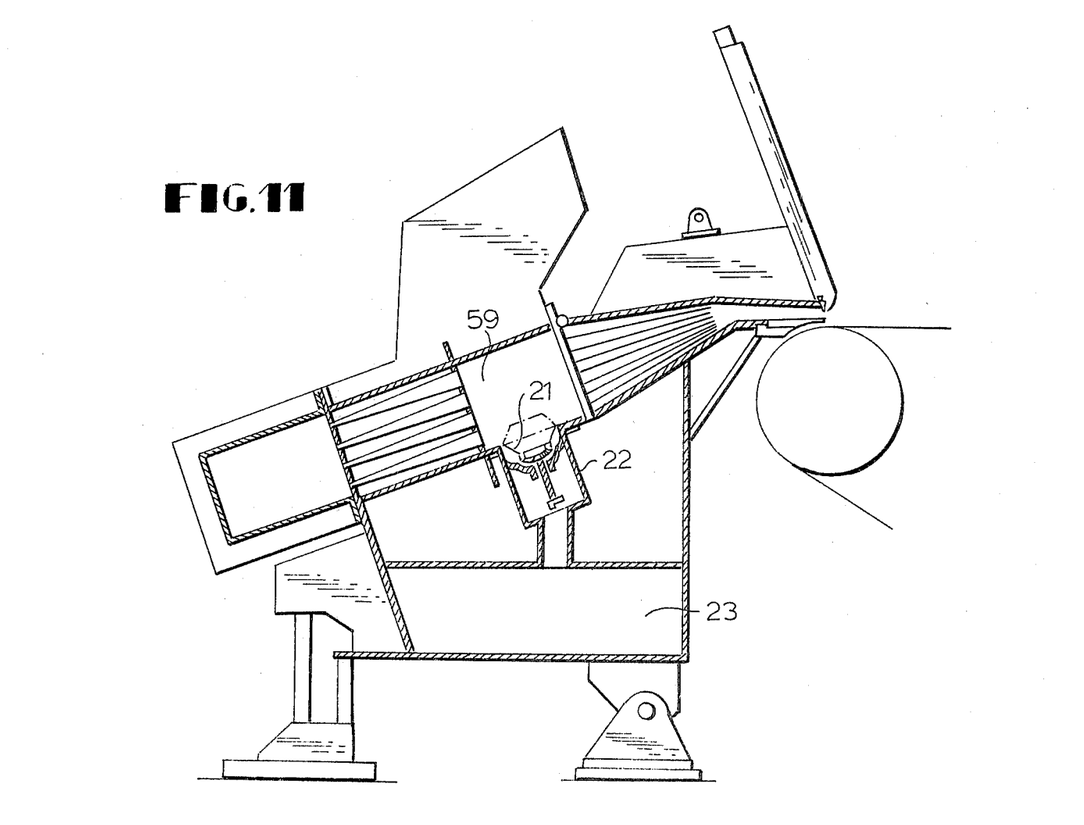
FIG. 11 is a side elevational sectional view of a further embodiment of the present invention.

A pressure pulse damping device according to the present invention may be utilized in a stock inlet structure. In order to apply a device according to the present invention to the structure as shown in FIG. 11, the device is positioned in the bottom wall of a staling chamber 59. A volume tank 23 can be provided within the stock inlet body, or a part of the stock inlet body can be utilized as a volume tank. Therefore, it is not necessary to provide additional space for installing the pressure pulse damping device and the accompanying volume tank.

A pressure pulse damping device according to the present invention has a construction essentially as described in detail above. Therefore, under certain conditions when pressure pulses occur in the liquid, the diaphragm is moved upwardly or downwardly. When the pressure of the liquid is increased whereby the diaphragm is moved downwardly to the lower position B, since the diaphragm is provided in the lower portion of the wall in the liquid passage, it is necessary that the pressure on the other side of the diaphragm be increased by an amount corresponding to the amount by which the lower surface of the liquid passage is lowered. Since the sealed chamber contains gas initially at a pressure equal to the average pressure of the liquid because the gas in the chamber is compressed by a volume equal to that by which the volume of the chamber is reduced when the diaphragm is lowered the pressure of the gas in the chamber is increased. When the pressure of the liquid is decreased, the pressure in the chamber is decreased by the expansion of the gas in the chamber. Consequently, if a chamber of a suitable capacity is provided under the diaphragm, a gas pressure increase due to an adiabatic compression of the gas places the gas pressure in equilibrium with the liquid pressure even though there is a resistance to the displacement of the diaphragm and a resistance to the deformation of the diaphragm.

A pressure pulse damping device according to the present invention is actuated for the damping of pulses in a manner unlike a surge tank type pressure pulse damping device. However, the mass of a pressure pulse damping device according to the present invention is small as compared to the devices as discussed as prior art herein; and therefore, it has relatively excellent high frequency characteristics.

In addition, a device according to the present invention contains sealed air so that it has improved low frequency damping characteristics which are irrespective of the responding and sensing capabilities of gauges etc.

A device according to the present invention can be manufactured at a relatively low cost and can be installed substantially anywhere. Moreover, no parts therein are exposed to a gas-liquid interface, and, consequently, the device is seldom soiled thereby increasing its useful life.

A device according to the present invention is more responsive to low-frequency pulses than a conventional attenuator, and, even when the diaphragm is expanded through use, it does not adversely affect the performance of the device.

Although a device according to the present invention is slightly inferior to a prior art attenuator with respect to the capability of eliminating high-frequency pulses, it is sufficiently effective in damping pressure pulses of up to forty Hz. Accordingly, a device according to the present invention can be used to substantially damping to high-frequency pulses.

In practice both, low and high frequency pulses are propagated in a system. Therefore, a conventional attenuator may not be effective with respect to intermediate and high frequency pulses particularly when the diaphragm is fully displaced by a low frequency component of a large variation in the flow rate per cycle. However, a device according to the present invention does not have this drawback.

What we claim is:

1. A pressure pulse damping device for use in a liquid passage, said damping device comprising:
   a flexible diaphragm made of an easily deformable material having a small mass and adapted to cover an opening in a bottom wall of the liquid passage, the edge of said diaphragm being adapted to be fixed relative to the wall of the liquid passage;
   a chamber beneath said diaphragm and to the interior of which the side of said diaphragm opposite the side facing the liquid passage faces, supporting means supporting said diaphragm between said chamber and said liquid passage for permitting at least a portion of said diaphragm to move out of and into said chamber perpendicular to the plane of the opening and in a radial direction of said liquid passage toward and away from the liquid passage, said supporting means being constituted by a support frame for said diaphragm, said support frame being attached to a portion of said diaphragm and positioned adjacent to the side of said diaphragm opposite the side facing the liquid passage, a support rod fixed to said support frame and extending radially outward from the liquid passage, and a porous plate defining a wall of said chamber for communicating said chamber with said diaphragm, said porous plate having a bore therethrough for radially slidably accommodating said support rod, whereby when the average pressure in the liquid passage is greater than that in said chamber said support rod moves away from the liquid passage and when the average pressure in the liquid passage is less than that in said chamber said support rod moves toward the liquid pressure;
   gas contained in said chamber at a pressure equal to the average pressure of the liquid in the passage;
   a gas supply means connected to said chamber for providing said chamber with gas whenever at least a portion of said diaphragm reaches a predetermined limit of radial movement away from the liquid passage;
   a gas discharge means connected with said chamber for discharging gas from said chamber whenever at least a portion of said diaphragm reaches a predetermined limit of radial movement toward the liquid passage;
   means for sealingly closing said chamber whenever said diaphragm moves toward and away from the liquid passage within the range between said limits of radial movement; and
   the total capacity of said chamber and said gas supply means being such that the change of shape of said diaphragm in response to a pulse of liquid in said passage causes a change in the pressure of said gas just sufficient to keep the pressure of the liquid in said liquid passage constant.

2. A pressure pulse damping device as claimed in claim 1, wherein said supporting means further includes a guide member fixed to said porous plate, said guide member being elongated in a radial direction with respect to the liquid passage and having an aperture therethrough which coincides with said bore for radially slidably accommodating said support rod.

3. A pressure pulse damping device as claimed in claim 1, further comprising a central member which is fixed to said support rod.

4. A pressure pulse damping device as claimed in claim 2, wherein said gas supply means includes:
   a gas supply;
   an inlet valve communicating said gas supply with said chamber; and
   an outer limit switch for opening said inlet valve, said outer limit switch being fixedly positioned adjacent said support rod for being actuated whenever at least a portion of said diaphragm reaches the limit of a predetermined range of radial movement away from the liquid passage.

5. A pressure pulse damping device as claimed in claim 3, wherein said gas discharge means includes:
   a discharge valve for discharging gas from said chamber; and
   an inner limit switch for opening said discharge valve, said inner limit switch being fixedly positioned adjacent said support rod for being actuated whenever at least a portion of said diaphragm reaches the limit of a predetermined range of radial movement toward the liquid passage.

6. A pressure pulse damping device as claimed in claim 4, wherein said central member is dimensioned such that it engages said outer limit switch to actuate said outer limit switch.

7. A pressure pulse damping device as claimed in claim 5, wherein said central member is dimensioned such that it engages said inner limit switch to actuate said inner limit switch.

* * * * *